US006893223B2

United States Patent
Roberts

(10) Patent No.: US 6,893,223 B2
(45) Date of Patent: May 17, 2005

(54) AIRFOIL ASSEMBLY

(75) Inventor: Frank J. Roberts, Farmington, NY (US)

(73) Assignees: Garrison Roberts, Cobbeskill, NY (US); Christopher Roberts, Huntersville, NC (US)

(*) Notice: Subject to any disclaimer, the term of this patent is extended or adjusted under 35 U.S.C. 154(b) by 115 days.

(21) Appl. No.: 10/263,857

(22) Filed: Oct. 3, 2002

(65) Prior Publication Data

US 2004/0067136 A1 Apr. 8, 2004

(51) Int. Cl.[7] ............................................. F04D 29/38
(52) U.S. Cl. .............................. 416/210 R; 416/223 R; 416/243
(58) Field of Search ..................... 416/223 R, 210 R, 416/228, 240, 243

(56) References Cited

U.S. PATENT DOCUMENTS

| | | | |
|---|---|---|---|
| 1,991,095 A | * 2/1935 | Hochstetter | 416/238 |
| 4,050,246 A | * 9/1977 | Bourquardez | 60/398 |
| 4,360,315 A | 11/1982 | Olson | |
| 5,246,343 A | * 9/1993 | Windsor et al. | 416/210 R |
| 5,599,168 A | * 2/1997 | Lund | 416/136 |
| 5,681,146 A | * 10/1997 | White | 416/223 R |
| 6,537,031 B1 | * 3/2003 | Bacskay | 416/207 |

* cited by examiner

*Primary Examiner*—Ninh H. Nguyen
(74) *Attorney, Agent, or Firm*—Stephen B. Salai, Esq.; Donna P. Suchy, Esq.; Harter Secrest & Emery LLP

(57) ABSTRACT

An airfoil assembly having a blade with a leading edge, a trailing edge, a root and a tip. The assembly rotates about a first axis. The blade has a planar windward surface parallel to a second axis which is orthogonal to the first axis. A third axis orthogonal with the first and second axes defines the general orientation of the blade viewed along the first axis; however, the blade is pitched at an angle relative to the third axis. The convex leading edge, convex tip, and concave trailing edge have similar radii, and the leading and trailing edges converge as they approach the tip.

33 Claims, 6 Drawing Sheets

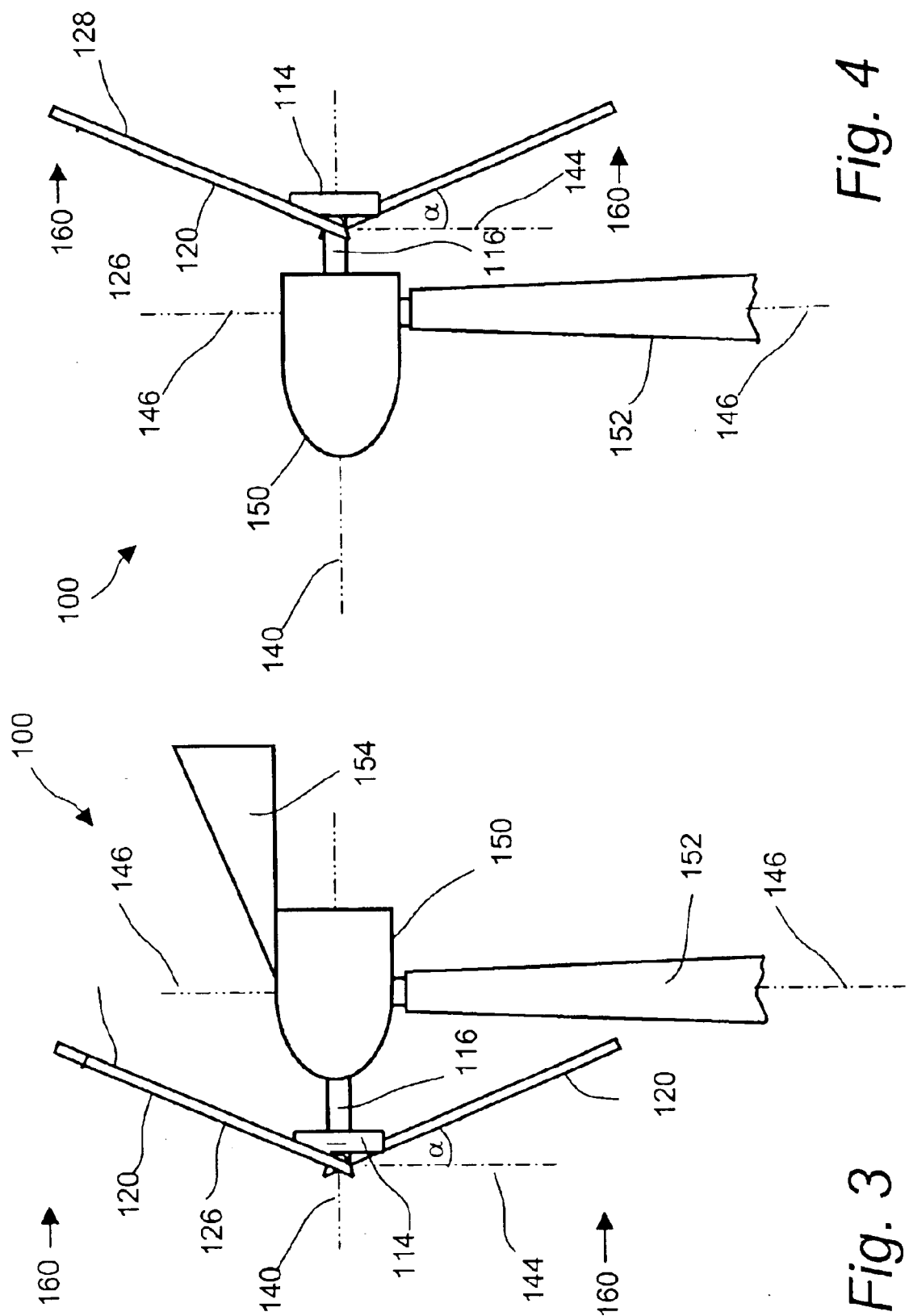

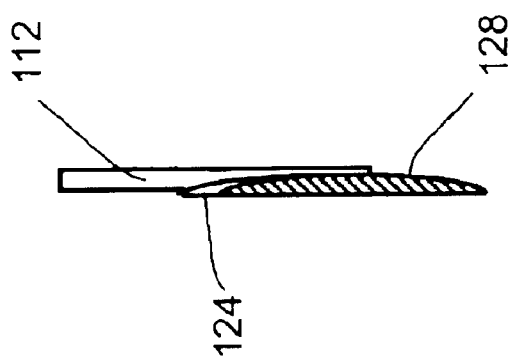
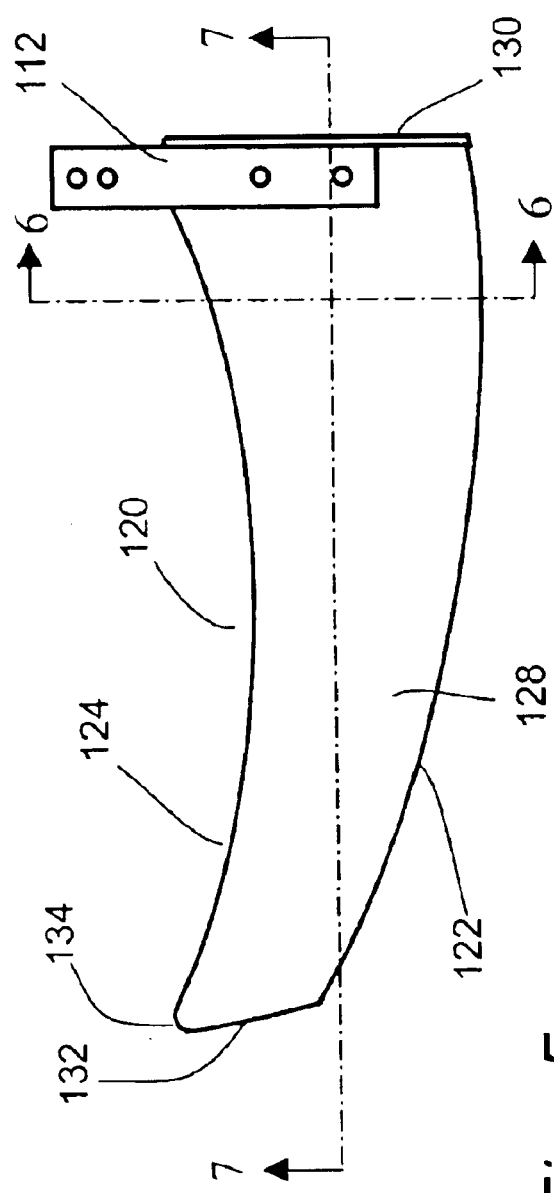
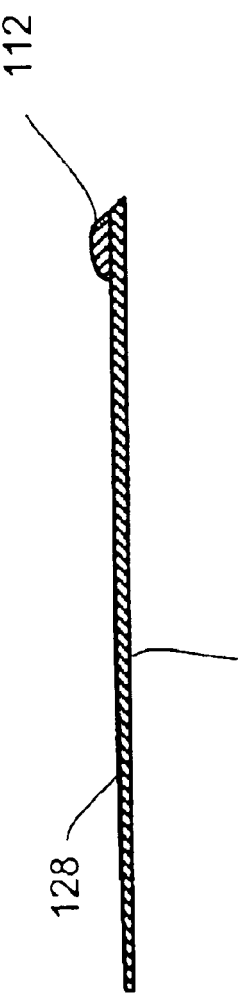

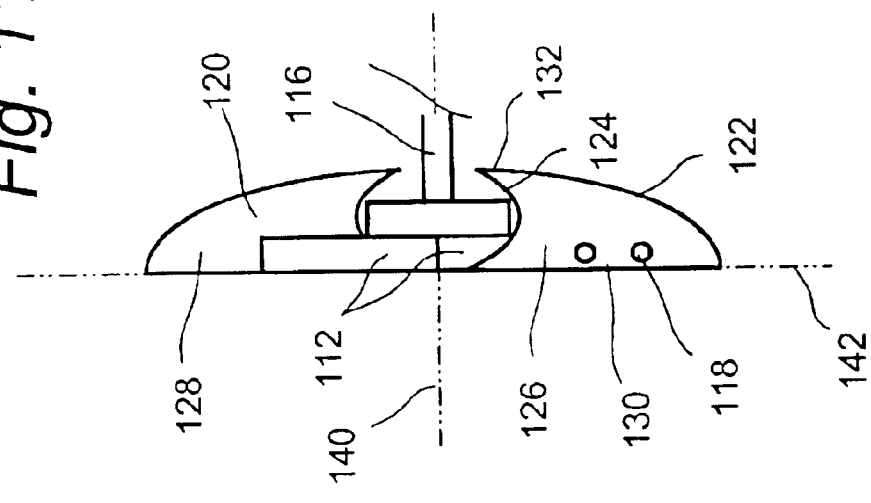
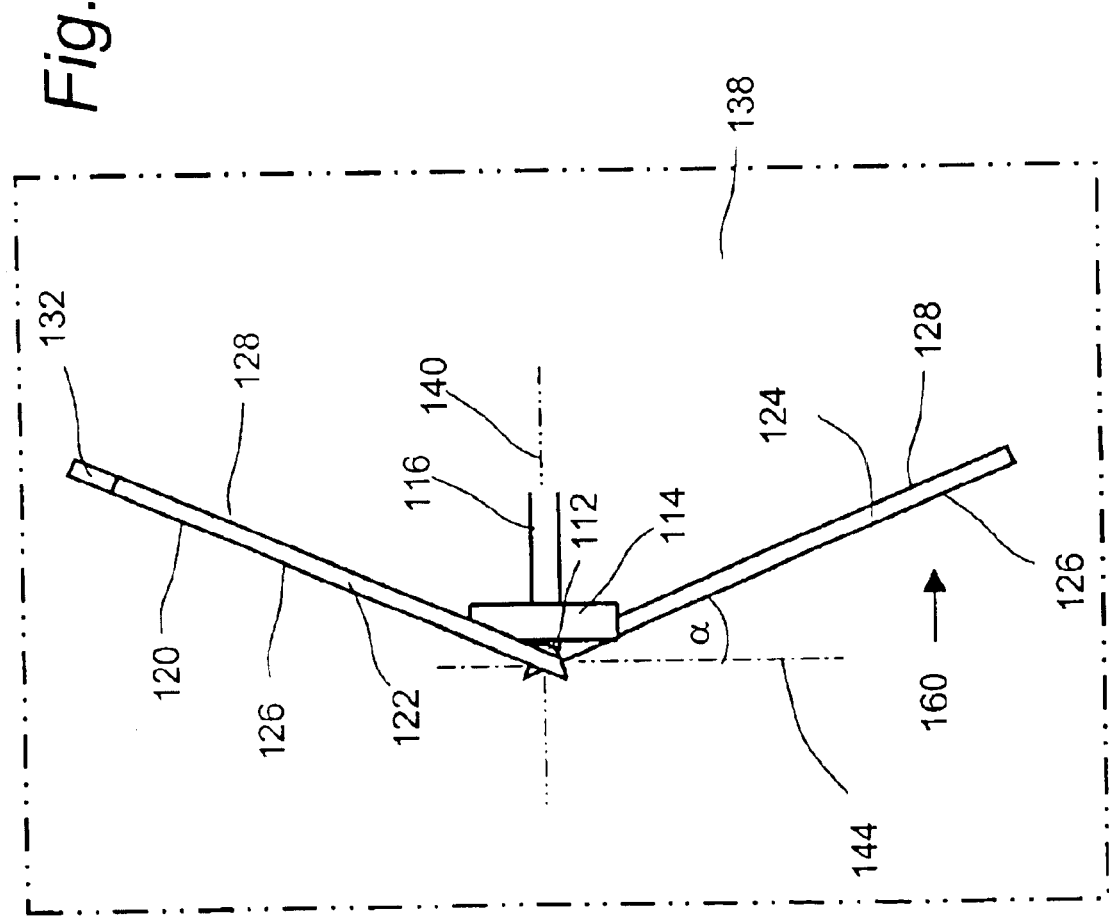

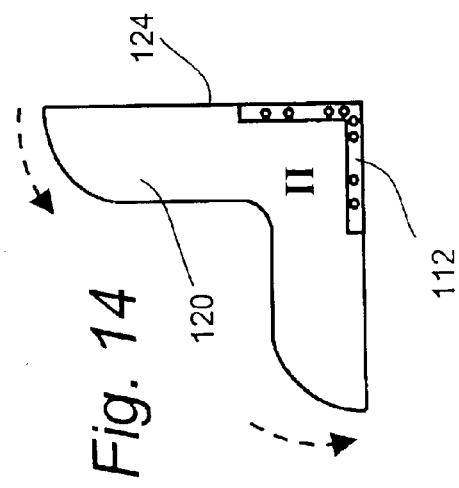
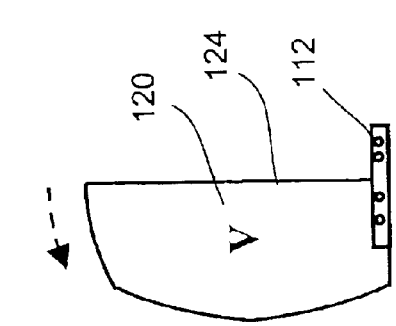
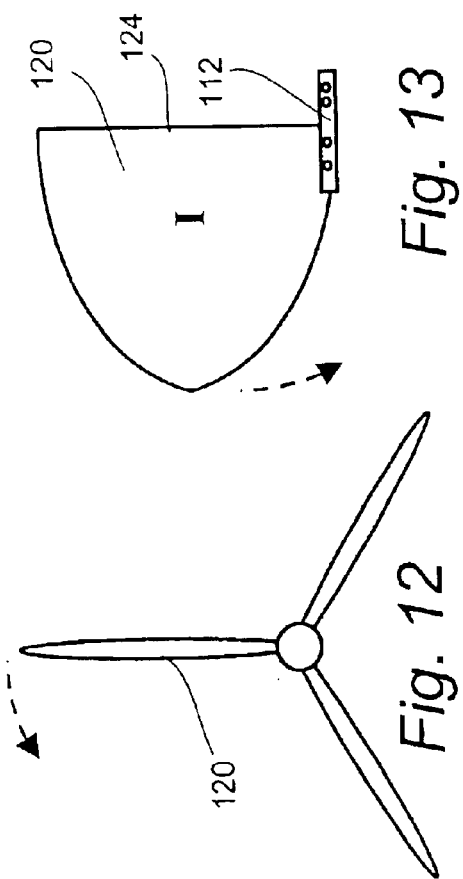
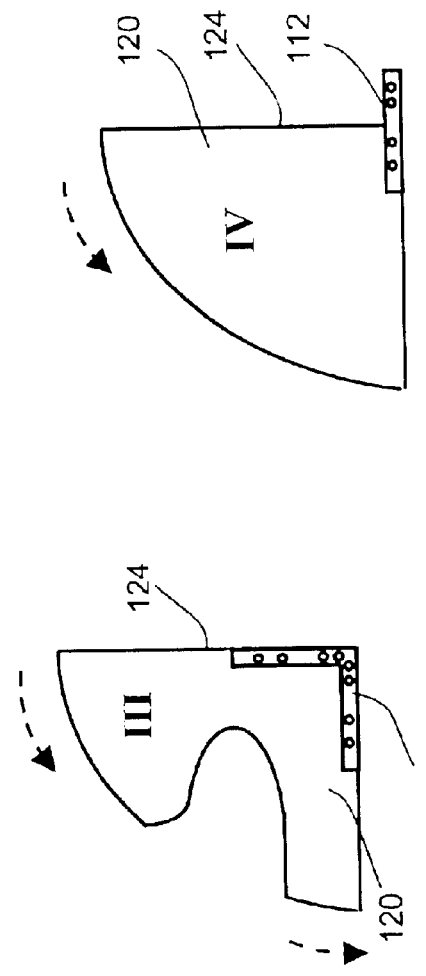

AIRFOIL ASSEMBLY

FIELD OF THE INVENTION

This invention relates to an airfoil assembly, and in particular to an airfoil assembly for a wind-driven generator which can usefully harness wind energy at low wind speeds.

BACKGROUND OF THE INVENTION

Wind energy has been harnessed for many generations, notably for powering sailing ships and windmills. Before the industrial revolution, windmills and windpumps were a familiar sight, typically converting wind energy directly to mechanical energy, and they never completely disappeared from the landscape. Wind turbines were first used to provide electric power in the late $19^{th}$ century; in the latter part of the $20^{th}$ century, wind farms began to appear for generating electricity in quantities sufficient, for example, to be fed into an electrical grid. While fossil fuels still appear to be plentiful, they are vulnerable to fluctuations in supply (and therefore price), often for geopolitical reasons; furthermore, accounting for their true cost would have to consider such factors as environmental degradation and defense expenditures. Wind-derived power is one attractive alternative to fossil fuels, since, in many climates, it can be produced locally.

A limitation of wind-derived power is its dependence on a variable resource. Other factors being equal, the power available from a wind turbine is proportional to the cube of the wind speed. Obviously, the lower the prevailing wind speed at a given location, the less power is available and the more costly is the generated power per unit. Furthermore, there is a threshold or startup wind speed below which most turbines are not reliably actuated because of insufficient torque. It is currently accepted that for wind-generated power to be considered at a given location, wind speeds of at least 7 miles per hour (mph) or 3 meters per second ($m.s^{-1}$) are required.

Wind speeds are conveniently assigned into classes (Table 1). Each class represents a mean wind power density range (in units of W/m2) or equivalent mean wind speed at specified altitudes.

TABLE 1

Wind Power Classifications

| | Altitude 10 m (33 ft) | | Altitude 50 m (164 ft) | |
|---|---|---|---|---|
| Wind Power Class | Wind Power Density W/m² | Speed m · s⁻¹ (mph) | Wind Power Density W/m² | Speed m · s⁻¹ (mph) |
| 1 | <100 | <4.4 (9.8) | <200 | <5.6 (12.5) |
| 2 | 100–150 | 4.4 (9.8)–5.1(11.5) | 200–300 | 5.6 (12.5)–6.4(14.3) |
| 3 | 150–200 | 5.1(11.5)–5.6(12.5) | 300–400 | 6.4(14.3)–7.0(15.7) |
| 4 | 200–250 | 5.6(12.5)–6.0(13.4) | 400–500 | 7.0(15.7)–7.5(16.8) |
| 5 | 250–300 | 6.0(13.4)–6.4(14.3) | 500–600 | 7.5(16.8)–8.0(17.9) |
| 6 | 300–400 | 6.4(14.3)–7.0(15.7) | 600–800 | 8.0(17.9)–8.8(19.7) |
| 7 | >400 | >7.0(15.7) | >800 | >8.8(19.7) |

Areas designated class 3 or greater are suitable for most wind turbine applications, whereas class 2 areas are marginal. Class 1 areas are generally not suitable, although a few locations (e.g., exposed hilltops) with adequate wind resource for wind turbine applications may exist in some class 1 areas.

Much of the world, including significant areas of the United States, are in wind power classes 1 and 2, which currently are not favored for power generation. There is therefore a need for an airfoil assembly that can more efficiently harness wind energy in zones 1 and 2. In particular an airfoil assembly is needed which has a reliable startup in wind power classifications 1 and 2. There is further a need that such an airfoil assembly can be made without excessive cost and with commonly available materials.

SUMMARY OF THE INVENTION

The present invention is an airfoil assembly configured to maximize the conversion of wind energy to mechanical energy. The airfoil assembly has a shaft capable of rotating about an axis to drive a generator or other energizing device such as a pump; the shaft could be a co-axial extension of a generator shaft, or could be connected to the energizing device through a suitable coupling such as a gear drive. A plurality of equally spaced arms extends outwardly from the shaft, a blade being attached to each arm at a root portion of the blade. Each blade extends in a substantially perpendicular direction from the arm. Since the arms extend in a generally radial direction from the shaft, the blades tend to be perpendicular to the radial direction, and each of the blades has a planar surface intended to face the wind (a windward surface). The planar windward surface of each blade is typically pitched at the same angle relative to the axis of rotation. The blade has a leading edge and a trailing edge, these edges converging as they extend from the root towards a tip; in other words, the length of the tip is less than that of the root. Further, in one configuration, the leading edge, trailing edge and tip are all curved.

The airfoil assembly and the generator are part of wind turbine unit; the unit can pivot about a vertical axis in response to changing wind direction. Optionally, the assembly can either be upwind or downwind of the vertical axis. With the downwind assembly, the turbine moves until the blades are on the leeward side of the pivot point. With the upwind configuration, the blades and the wind source direction are both to the same side of the pivot point; in this case, a stabilizing fin is required to the opposite side of the center of rotation.

Preferably, the blades have contoured leeward surfaces to provide an airfoil shape. Thus, when the turbine is functioning, the planar surfaces are on the windward side of the blades and the contoured surfaces are on the leeward side.

BRIEF DESCRIPTION OF THE DRAWINGS

FIG. 3 is a side view of a wind-driven generating system having the two-blade airfoil assembly, the system in a upwind configuration.

FIG. 4 is a side view of a wind-driven generating system having the two-blade airfoil assembly, the system in a downwind configuration.

FIG. 5 is a leeward view of one of the blades.

FIG. 6 is a cross section of the blade of FIG. 5 viewed along 6—6.

FIG. 7 is a cross section of the blade of FIG. 5 viewed along 7—7.

FIG. 10 is a more detailed side view of the airfoil assembly oriented as in FIGS. 3 and 4.

FIG. 11 is a side view of the airfoil assembly having rotated 90° from its orientation in FIG. 10.

FIG. 12 is a leeward view of an industry standard airfoil assembly.

FIGS. 13–17 are leeward views of blade shapes used in comparative tests.

DETAILED DESCRIPTION OF THE INVENTION

Figure 2:
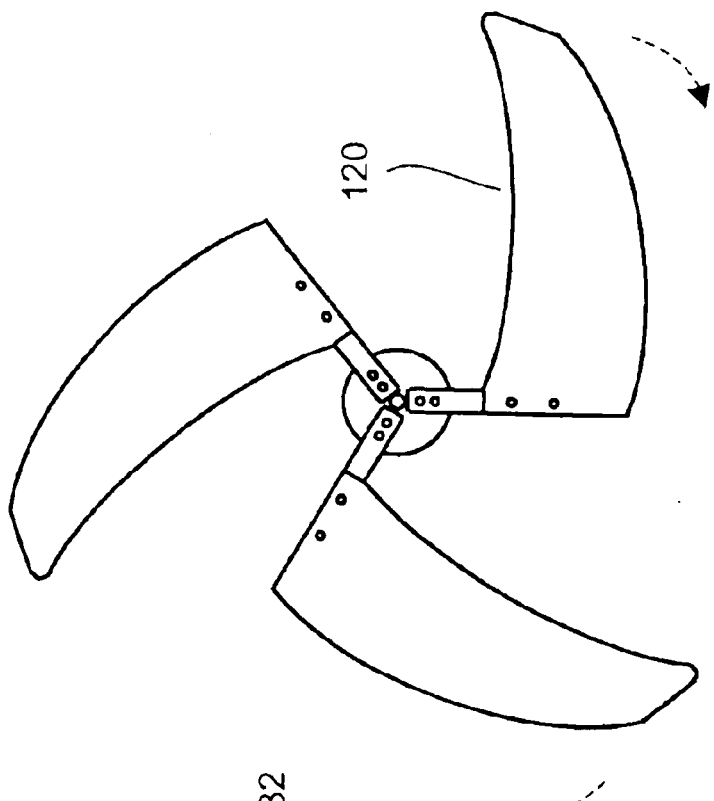
FIG. 2 is a windward view of an airfoil assembly having three blades.

Referring now to FIGS. 1–4, an airfoil assembly 110 for a wind-driven generating system 100 includes a blade 120 attached to an arm 112 that extends outwardly from a hub 114 fixedly mounted to a rotatable shaft 116. Normally, attachment means 118 such as screws, bolts or rivets are used to attach the blade 120 to the arm 112 and the arm 112 to the hub 114. However, it is understood that other attachments such as welding, bonding or integral forming can be used. Optionally, the blade 120 may be attached directly to the hub 114, a portion of the blade 120 being shaped to extend outwardly from the hub 114 in place of the arm 112.

As best seen in FIGS. 5–7, the blade has a leading edge 122, a trailing edge 124, a planar windward surface 126 and a leeward surface 128. Typically, the leeward surface 128 is contoured to provide an airfoil surface, as is familiar in aerodynamics. The airfoil reduces air pressure leeward of the blade 120 when wind is incident on the windward surface 126, thus increasing the net force on the blade 120. For similar reasons, the arm 112 is typically contoured, the contour merging with that of the blade 120, as best seen in FIG. 7.

An end of the blade 120 referred to as a root 130 is attached to the arm 112, an opposed end of the blade 120 being known as a tip 132. The leading edge 122 and the trailing edge 124 converge as they extend from the root 130 to the tip 132. The leading edge 122, the trailing edge 124 and the tip 132 are all arcuate, and preferably have similar or identical radii of curvature. The leading edge 122 and the tip 132 are convex while the trailing edge 124 is concave. A transition region 134 between the trailing edge and the tip 132 is rounded to reduce turbulence, thus increasing efficiency and reducing noise. The preferred common radius of the leading edge 122, the trailing edge 124 and the tip 132 is equal to the rotational radius of the airfoil assembly 110 (RR in FIG. 9). The rotational radius RR extends radially from a first axis 140 to the extreme of the tip 132.

Figure 8:
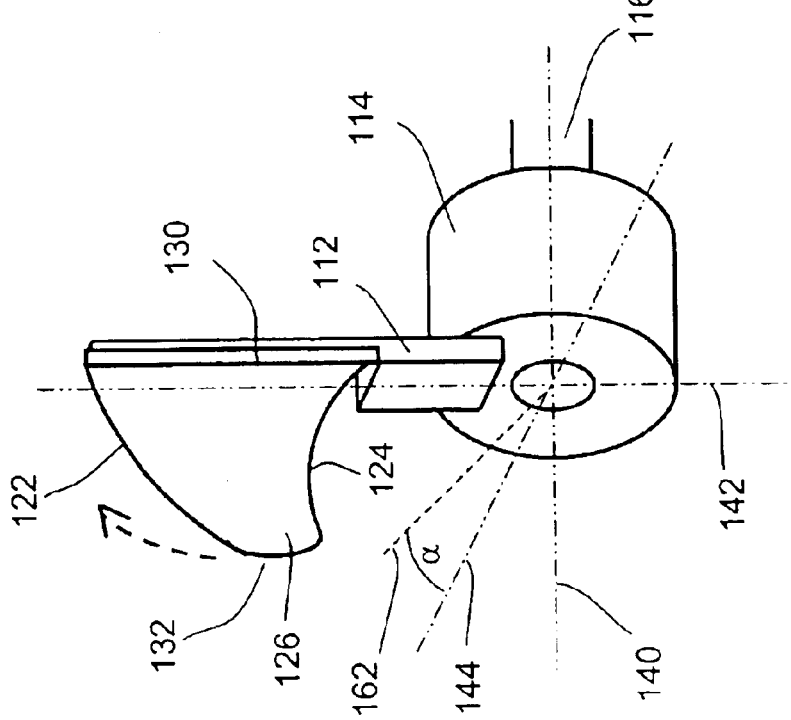
FIG. 8 shows a schematic perspective view of a portion of the airfoil assembly relative to three mutually orthogonal axes.

FIG. 8 schematically shows three mutually orthogonal axes relative to the blade 120. The first axis 140 is a rotational axis coaxial with the shaft 116. A second axis 142 extends outwardly from the first axis 140 in the general direction of the arm 112. The second axis 142 defines an orientation of the arm 112; in particular, the second axis 142 is coincident or parallel with the plane of the windward surface 126. The third axis 144 defines a general orientation of the blade 120, and further defines a pitch angle α shown in FIG. 8; the uniformly dashed line 162 of FIG. 8 is coplanar with the windward surface 126. In other words, the pitch angle α is the angle between the third axis and a projection of the windward surface 126, viewed as in FIG. 10, onto a plane defined by the first axis 140 and the third axis 144. If the windward surface 126 and the third axis 144 were identically oriented, the pitch angle α would be zero. In fact, the pitch angle α is selectable. Regardless of any changes to the pitch angle α the plane of the windward surface 126 remains parallel with the second axis 142.

The hub 114 is fixedly mounted to a shaft 116 that is free to rotate about the first axis 140. The shaft 116 is typically common to the airfoil assembly 110 and an electric generator 150; optionally, however, the shaft 116 may be connected to the generator 150 through a suitable coupling such as a gear drive (not shown). When the assembly 110 is driven by the wind, it causes the shaft 116 to rotate and drive the generator 150, thus producing electrical power.

Typically, the generator 150 is pivotally attached to a tower 152, allowing the airfoil assembly 110 and generator 150 to pivot freely about a vertical axis 146.

Figure 1:
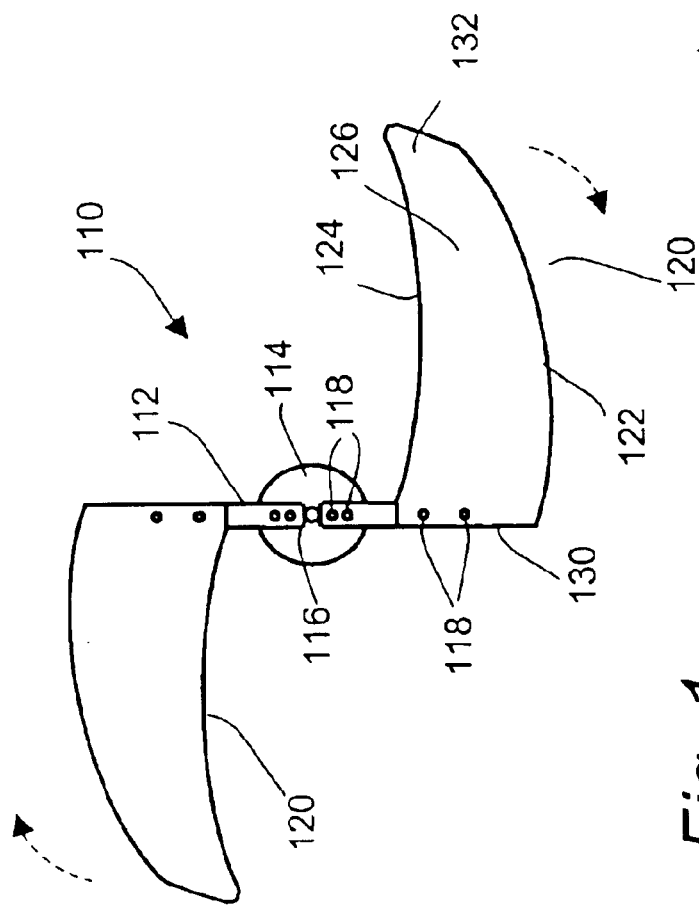
FIG. 1 is a windward view of an airfoil assembly having two blades.

FIG. 10 shows a two-blade assembly 110 viewed from the same direction as in FIGS. 1 and 2, the arms 112 extending perpendicularly into and out of the drawing. FIG. 11 represents the same assembly having rotated 90° from its position in FIG. 10, the arms 112 now extending up and down parallel to the plane of the drawing. Of course, the number of blades 120 in the airfoil assembly 110 may be greater or less than two, an example with three blades 120 appearing in FIG. 2. An airfoil assembly 110 having only a single blade 120 would have a balancing counterweight.

For a given blade 120, the second axis 142 and third axis 144 rotate with the blade; in other words, different second axes 142 and third axes 144 are defined for each blade. All blades in a given airfoil assembly 110 have the same pitch angle α. As will be seen later, unless α=0, the tip 132 is always downwind of the root 130. The efficiency of the airfoil assembly 110 is sensitive to the pitch angle α, which α is preferably in the range 12–22° and most preferably in the range 14–18°. Larger angles improve startup torque, while smaller angles lead to higher rotational speeds. As is known in the art, and need not be elaborated here, the airfoil assembly may be spring loaded so that as wind speed increases, the pitch angle α decreases.

The wind-driven generating system 100 can be constructed so that the airfoil assembly 110 is either upwind of the generator 150 as in FIG. 1, or downwind as in FIG. 2. The downwind configuration is self-stabilizing; the upwind configuration is unstable but can be readily stabilized by using a vertical stabilizing vane 154 coplanar with the first axis 140. Note that the airfoil assembly 110 is itself identically oriented relative to wind direction (represented by arrows 160) regardless of whether the downwind or upwind configuration is used.

Both the downwind and upwind configurations work as follows. The wind speed aligns the generating system 100 so that the intended windward surfaces 126 actually face windward; a sufficient wind speed rotates of the airfoil assembly 110 about the first axis 140, causing the generator 150 to produce power.

The planarity of the windward surface 126, its orientation parallel to the second axis 142, and the general shape of the blade 120 are important to the present invention. In particular, the blades 120 rotate so that the leading edges 124 cut into the wind with minimum turbulence, as is familiar in rowing when an oar blade can be oriented to enter water with very little disturbance. Since turbulence leads to energy loss, the minimal turbulence of the present invention enables an efficient use of wind power, and startup wind speeds as low as 2.5 mph or 1.1 m.s$^{-1}$ have been realized. It is therefore feasible to use the invention in class 1 areas that have hitherto been considered unsuitable for wind power generation. Obviously, minimizing energy loss is also beneficial higher wind speeds.

Figure 9:
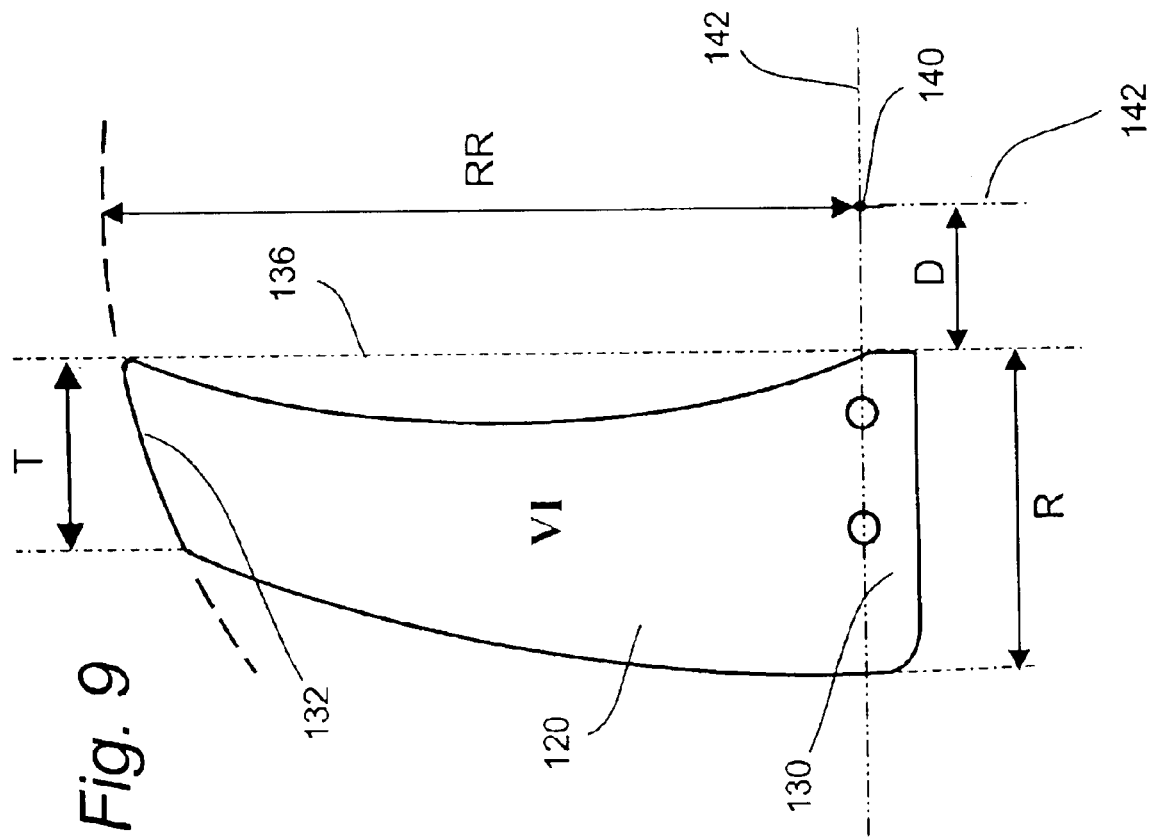
FIG. 9 is a plan view of the blade relative to the axes of FIG. 8.

Various dimensions or distances relative to the blade 120 and its relationship to the first axis 140 are defined by alphabetical symbols in FIG. 9, which also best shows the orientation of the tip 132, which has a center of curvature coinciding with the first axis 140, the radius of curvature being RR. Note also that the trailing edge 124 is disposed such that a chord 136 extending between the second axis 142 and the tip 132 is parallel to the third axis 144. Finally, note that in FIG. 9, the distance D represents an offset of the blade from the first axis 140. Table 2 shows numerical values in three selected instances of airfoil assemblies 110 conforming to the present invention.

TABLE 2

Numerical Blade Parameters for Three Selected Airfoil Assemblies

| Dimension or distance | Values (mm) for assembly radius of | | | Values normalized with respect to RR | | |
|---|---|---|---|---|---|---|
| | 4" | 5" | 6" | | | |
| D | 15 | 19 | 23 | 0.15 | 0.15 | 0.15 |
| T | 20 | 25 | 29 | 0.20 | 0.20 | 0.19 |
| R | 44 | 54 | 65 | 0.43 | 0.43 | 0.42 |
| RR | 102 | 127 | 153 | 1 | 1 | 1 |

The values in table 2 normalized with respect to assembly radius RR are consistent from blade to blade. In tests with scaled-up assemblies 110 of up to 23" (585 mm) radius, it is found that the performance of an airfoil assembly 110 is practically independent of scale, provided the various normalized values are held within about ±10%. From the data in Table 2, it is can be determined that R/T, which represents the ratio of lengths across the root and the tip, is consistently about 2.2. Given the ±10% tolerance just cited, the preferred value of R/T lies in the range 1.7–2.7.

The airfoil assembly blades 120 can be made from a variety of materials, and may be designed to have a greater or lesser degree of flexibility. In tests with airfoil assemblies 120 with radii up to 23", blade materials have included wood, 0.020", 0.032" and 0.042" (0.5, 0.8 and 1.1 mm) thick spring steel, 3/32" and 5/32" (4.8 and 7.9 mm) thick plexiglas, and 1/32" and 1/16" (0.8 and 1.6 mm) thick carbon fiber composites. It was not possible to contour the spring steel because of its low thickness, but for other materials, contouring was achieved by machining the leeward surface 128, at a minimum bevelling an airfoil shape at the leading edge 122, the trailing edge 124 and the root 130 of the blade. In manufacturing, any selected contour could be achieved by injection molding suitable materials.

The more flexible the blade 120, the more it will be deformed by centrifugal force with increasing wind speed. Obviously, flexibility implies that the windward surface 126, while planar when the blade 120 is stationary, becomes curved as the wind speed increases. For the purposes of this specification, the requirement that the windward surface 126 be planar is confined to the stationary blade 120. An optimum degree of flexibility is desirable to limit the rotation of the airfoil assembly 110 within a certain limiting speed, which is necessary to preclude overloading the generator 150 at high wind speeds; as the blade 120 increasingly flexes, turbulence sets in and establishes the limiting speed. An optimal self-limiting design would provide the maximum efficiency at all speeds while inducing a degree of flexing to achieve a desired limiting speed.

Comparative Tests

The airfoil assembly 100 was tested against a number of different airfoil assemblies including an industry standard with a conventional propeller shape as illustrated in FIG. 12. It is convenient to arbitrarily designate experimental blade shapes as shapes I–V, shown in FIGS. 13–17 respectively. The blade shape of the present invention is designated as shape VI. Obviously, there is an infinite number of possible blade shapes and one designated blade shape can "evolve" towards another shape without a sharply discernable transition. In particular, a gradual transition of shape V to shape VI of the present invention is easily visualized. Many tests were performed in an iterative process whereby shape VI was arrived at.

For the tests, the airfoil assembly 110 was placed 12" (300 mm) downstream of a 16" (405 mm) diameter wind tunnel, and exposed to "low", "medium" and "high" wind speeds of 3.7, 5.4 or 7.4 mph, which respectively equal 1.7, 3.4 and 3.3 m.s$^{-1}$. The speeds of the airfoil assemblies 110 in revolutions per minute were determined stroboscopically. Table 3 shows data from selected tests of the industry standard and of each defined blade shape.

TABLE 3

Selected Test Data for Different Airfoil Assemblies

| Test ID#* | No. of blades | Blade shape | Pitch angle, ° | D (mm) | R (mm) | RPM at wind speed | | |
|---|---|---|---|---|---|---|---|---|
| | | | | | | low | med. | high |
| 1 | 3 | Industry standard | | 0 | 279 | 0 | 0 | 64 |
| 21 | 3 | I | 14 | 51 | 267 | 185 | 312 | 451 |
| 29 | 2 | II | 16 | 19 | 241 | 144 | 281 | 398 |
| 31 | 2 | III | 16 | 19 | 241 | 154 | 289 | 380 |
| 41 | 2 | IV | 16 | 19 | 241 | 148 | 287 | 418 |
| 71 | 2 | V | 40–14*** | 38 | 254 | 242 | 435 | 600 |
| 210** | 2 | VI | 20 | 38 | 191 | 491 | 832 | 1124 |
| 240** | 2 | VI | 20 | 38 | 191 | 605 | 1024 | 1460 |

Notes:
*blade material for all tests was 3/32" (2.4 mm) thick Plexiglas, except for #240 in which 1/16" (0.8 mm) carbon fiber composite was used.
**test nos. 210 and 240 were identical except that in 210 the leeward surface was flat and in 240 the leeward surface was contoured.
***variable pitch; initially 40°, advanced to 14°.

It is evident from Table 3 that the industry standard shape does not start up in response to the low or medium wind speeds. While all the other blade shapes are responsive to low wind speeds, shape VI, which is the shape in the present invention, is far superior to any of the other shapes in terms of its rotational speed at any incident wind speed.

In addition to the wind tunnel tests, several field tests were run. While the best pitch angle α in the wind tunnel tests was 20°, the field tests indicated that the highest rotational speeds were obtained with a in the range 14–18°. Also, startup wind speeds of 2.5 mph or 1.1 m.s$^{-1}$ were achieved in field tests.

The advantages of the present invention are as follows. First, the planarity of the windward surface 126, and the shape and orientation of the blade 120 provides that turbulence is minimized until the airfoil assembly approaches the limiting speed. As described earlier, for a blade 120 with an appropriate degree of flexibility, the windward side then becomes non-planar and introduces intentional turbulence.

Secondly, the convergence of the blade 120 from a relatively wide root 130 to a relatively narrow tip 132 ensures that flexing of the blade 120 is confined to an area near to the tip 132. Flexing nearer to the root 130 would necessarily flex a much greater proportion of the blade 120, leading to excessive turbulence and instability which would lead to too low a limiting speed. Defining a blade length as being generally similar in magnitude to the rotational radius RR of FIG. 9, preferably only the outermost 50% of the blade length should flex as the airfoil assembly 110 rotates; more preferably only 25% and most preferably only 10% of the blade length should flex. Clearly, proper selection of blade material, shape and dimensions can optimize the limiting speed. Also, the blade 120 should be configured to suit the requirements of a particular generator 150 coupled to the airfoil assembly 110, since different generators require different limiting speeds.

Thirdly, spacing of the blade 120 from the first axis 140 permits the root 130 to be significantly spaced from the first axis; therefore, the strongest and most rigid portion of the blade exerts significant moment about the first axis 140. These attributes translate to a low startup wind speed and faster rotation at any wind speed compared to the industry standard and to assemblies with different blade shapes. To summarize, then, the present invention provides the benefits of both low startup wind speeds and efficient wind energy conversion.

We claim:

1. An airfoil assembly with mutually orthogonal first, second and third axes, the assembly comprising:

a shaft rotatable about the first axis;

an arm extending outwardly from the shaft; and a blade connected to the arm;

the blade having a leeward surface, a planar windward surface, a leading edge, a trailing edge, a root attached to the arm and a tip spaced from the root, the leading edge and the trailing edge converging as they extend from the root towards the tip, the plane of the windward surface being parallel to the second axis, a projection of the windward surface onto a plane defined by the first axis and the third axis having a pitch angle relative to the third axis.

2. The airfoil assembly of claim 1, the pitch angle being in the range 12–22°.

3. The airfoil assembly of claim 1, the pitch angle being in the range 14–18°.

4. The airfoil assembly of claim 1, the leading edge, the trailing edge and the tip being curved.

5. The airfoil assembly of claim 1, the leading edge and the tip being convex, the trailing edge being concave.

6. The airfoil assembly of claim 5, the leading edge, the trailing edge and the tip having identical radii of curvature.

7. The airfoil assembly of claim 1, the root having between 1.7 and 2.7 times the length of the tip.

8. The airfoil assembly of claim 1, the root having between 2.1 and 2.3 times the length of the tip.

9. The airfoil assembly of claim 1, having a rounded transition region between the trailing edge and the tip.

10. The airfoil assembly of claim 1, the leeward surface being contoured.

11. The airfoil assembly of claim 1, the arm being contoured.

12. The airfoil assembly of claim 1 having a plurality of blades equally spaced about the shaft, each blade having the same pitch angle.

13. The airfoil assembly of claim 1, an outer portion of the blade capable of flexing as the airfoil assembly rotates.

14. The airfoil assembly of claim 13, the outer portion limited to 50% of the blade length.

15. The airfoil assembly of claim 13, the outer portion limited to 25% of the blade length.

16. The airfoil assembly of claim 13, the outer portion limited to 10% of the blade length.

17. The airfoil assembly of claim 1, further comprising an energizing device coupled to the shaft.

18. An airfoil assembly with mutually orthogonal first, second and third axes, the assembly comprising:

a shaft rotatable about the first axis; and a blade connected to the shaft;

the blade having a leeward surface, a planar windward surface, a leading edge, a trailing edge, a root attached to the shaft and a tip spaced from the root, the leading edge and the trailing edge converging as they extend from the root towards the tip, the plane of the windward surface being parallel to the second axis, a projection of the windward surface onto a plane defined by the first axis and the third axis having a pitch angle relative to the third axis.

19. The airfoil assembly of claim 18, the pitch angle being in the range 12–22°.

20. The airfoil assembly of claim 18, the pitch angle being in the range 14–15°.

21. The airfoil assembly of claim 18, the leading edge, the trailing edge and the tip being curved.

22. The airfoil assembly of claim 18, the leading edge and the tip being convex, the trailing edge being concave.

23. The airfoil assembly of claim 22, the leading edge, the trailing edge and the tip having identical radii of curvature.

24. The airfoil assembly of claim 18, the root having between 1.7 and 2.7 times the length of the tip.

25. The airfoil assembly of claim 18, the root having between 2.1 and 2.3 times the length of the tip.

26. The airfoil assembly of claim 18, having a rounded transition region between the trailing edge and the tip.

27. The airfoil assembly of claim 18, the leeward surface being contoured.

28. The airfoil assembly of claim 18 having a plurality of blades equally spaced about the shaft, each blade having the same pitch angle.

29. The airfoil assembly of claim 18, an outer portion of the blade capable of flexing as the airfoil assembly rotates.

30. The airfoil assembly of claim 29, the outer portion limited to 50% of the blade length.

31. The airfoil assembly of claim 29, the outer portion limited to 25% of the blade length.

32. The airfoil assembly of claim 29, the outer portion limited to 10% of the blade length.

33. The airfoil assembly of claim 18, further comprising an energizing device coupled to the shaft.

* * * * *